(12) United States Patent
Sodagar

(10) Patent No.: US 12,501,326 B2
(45) Date of Patent: Dec. 16, 2025

(54) METHOD FOR DESCRIBING AND CONFIGURING THE 5G MEDIA SERVICE ENABLERS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 442 days.

(21) Appl. No.: 18/192,921

(22) Filed: Mar. 30, 2023

(65) Prior Publication Data

US 2023/0362759 A1    Nov. 9, 2023

Related U.S. Application Data

(60) Provisional application No. 63/338,338, filed on May 4, 2022.

(51) Int. Cl.
*H04W 36/00* (2009.01)
*H04L 65/60* (2022.01)
(Continued)

(52) U.S. Cl.
CPC ......... *H04W 36/0083* (2013.01); *H04L 65/60* (2013.01); *H04W 36/22* (2013.01); *H04L 65/1016* (2013.01)

(58) Field of Classification Search
CPC ... H04L 65/1016; H04L 65/60; H04L 65/612; H04W 36/0083; H04W 36/16; H04W 36/22
See application file for complete search history.

(56) References Cited

U.S. PATENT DOCUMENTS

2005/0005025 A1* 1/2005 Harville ............... H04L 65/612
  709/241
2008/0307108 A1* 12/2008 Yan ....................... H04L 67/306
  380/278

(Continued)

FOREIGN PATENT DOCUMENTS

WO    2022/077066 A1    4/2022

OTHER PUBLICATIONS

Communication from Japanese Patent Office dated May 27, 2025 in Application No. 2024-531146.

(Continued)

*Primary Examiner* — Jeong S Park
(74) *Attorney, Agent, or Firm* — Sughrue Mion, PLLC

(57) ABSTRACT

There is included a method and apparatus comprising computer code configured to cause a processor or processors to generate a media service enabler (MSE) configuration of an MSE specification of a 5G media streaming (5GMS) service, determine whether at least one of a software development kit (SDK) and a microservice conforms to the MSE specification, set, by at least one of a function and a service, a configuration of the at least one of the SDK and a microservice according the MSE specification and based on determining that the at least one of the SDK and the microservice conforms to the MSE specification, and control an implementation of a 5G media streaming (5GMS) service according to the configuration of the at least one of the SDK and the microservice, the at least one of the function and the service is external to the implementation of the 5GMS service.

20 Claims, 18 Drawing Sheets

(51) Int. Cl.
*H04W 36/22* (2009.01)
*H04L 65/1016* (2022.01)

(56) References Cited

U.S. PATENT DOCUMENTS

| | | | |
|---|---|---|---|
| 2017/0034015 A1 | 2/2017 | Li et al. | |
| 2017/0093942 A1* | 3/2017 | Danielsson | H04N 21/2407 |
| 2017/0244773 A1* | 8/2017 | Sheynman | H04L 67/52 |
| 2021/0352113 A1 | 11/2021 | Sodagar | |
| 2022/0224746 A1* | 7/2022 | Li | H04L 65/764 |
| 2022/0240061 A1* | 7/2022 | Sodagar | H04W 4/20 |

OTHER PUBLICATIONS

Dahlman et al.,"5G Wireless access: requirements and realization", IEEE Communication Magazine—Communications Standards Supplement, Dec. 2014, pp. 42-47 (6 pages).

Rizou et al., "A service platform architecture enabling programmable edge-to-cloud virtualization for the 5G Media industry", IEEE International Symposium on Broadband Multimedia Systems and Broadcasting, 2018 (6 pages).

ETSI, "5G Media Streaming (5GMS); General description and architecture (3GPP TS 26.501 version 16.7.0 Release 16)", 2021 (49 pages).

International Search Report dated Jul. 20, 2023 in Application No. PCT/US2023/017389.

Written Opinion dated Jul. 20, 2023 in Application No. PCT/US2023/017389.

"3rd Generation Partnership Project; Technical Specification Group Services and System Aspects; 5G Media Streaming (5GMS); General description and architecture Release 17", 3GPP TS 26.501 v17.0.1, , Jan. 2022, pp. 1-87.

Jon Leech, "Asciidoctor Workflow", Presented to the ANARI Working Group, Mar. 18, 2020, pp. 1-12.

"Pseudo Change Request", 3GPPSA4-e (AH) MBS SWG post 117-e, E-meeting, Mar. 10, 2022, pp. 1-12, S4al221338.

"SID New: Feasibility Study on 5G Media Service Enablers", Qualcomm Incorporation, Dolby Laboratories Inc,, Orange Tencent, Facebook, Samsung Electronics Co., LTD, Xiaomi, Nokia Corporation, AT&T, 3GPP TSG SA#94-e, e-Meeting, Dec. 14-20, 2021, pp. 1-3, SP-211338.

LTE; 5G; Support of 5G glass-type Augmented Reality / Mixed Reality (AR/MR) devices (3GPP Tr 26.998 version 17.0.0 Release 17), ETSI Technical Report, European Telecommunications Standards Institute (ETSI), 650, Route Des Lucioles ; F-06921 Sophia-Antipolis; France, vol. 3GPP SA, No. V17.0.0 Apr. 13, 2022 (Apr. 13, 2022), pp. 1-120, XP014428980.

European Search Report dated Sep. 22, 2025 in Application No. EP 23 78 9856.

\* cited by examiner

METHOD FOR DESCRIBING AND CONFIGURING THE 5G MEDIA SERVICE ENABLERS

CROSS REFERENCE TO RELATED APPLICATION

The present application claims priority to provisional application U.S. 63/338,338 filed on May 4, 2022, the contents of which are hereby expressly incorporated by reference, in its entirety, into the present application.

BACKGROUND

1. Field

This disclosure defines a framework to develop the specification and deploy them as media service enablers as an SDK or as a microservice on a cloud processor.

2. Description of Related Art

The current design is a monolithic specification without defining the media service enabler for each function or group of functions. That is, even if the 5G media streaming (5GMS) architecture provides an extension to use the edge servers in its architecture. The 5GMS architecture is deficient as unable to be deployed as a set of SDKs on a device or as a set of microservices on the cloud.

SUMMARY

To address one or more different technical problems, this disclosure provides technical solutions to reduce network overhead and server computational overheads while delivering an option to apply various operations to the resolved element such that in using these operations some of practicality and technical signaling features thereof may be improved.

There is included a method and apparatus comprising memory configured to store computer program code and a processor or processors configured to access the computer program code and operate as instructed by the computer program code. The computer program code comprises generating code configured to cause the at least one processor to implement generating code configured to cause the at least one processor to implement generating a media service enabler (MSE) configuration of an MSE specification of a 5G media streaming (5GMS) service; determining code configured to cause the at least one processor to implement determining whether at least one of a software development kit (SDK) and a microservice conforms to the MSE specification; setting code configured to cause the at least one processor to implement setting, by at least one of a function and a service, a configuration of the at least one of the SDK and the microservice according the MSE specification and based on determining that the at least one of the SDK and the microservice conforms to the MSE specification; and controlling code configured to cause the at least one processor to implement controlling an implementation of a 5G media streaming (5GMS) service according to the configuration of the at least one of the SDK and the microservice, wherein the at least one of the function and the service is external to the implementation of the 5GMS service.

According to exemplary embodiments, the implementation of the 5GMS service comprises an implementation of at least one of an MSE SDK abstraction, an MSE SDK instantiation, and an MSE microservice.

According to exemplary embodiments, the MSE SDK abstraction indicates media aspects, an MSE configuration comprising an MSE description document (MDD), and an MSE configuration application programming interface (API) (MCA), the MSE SDK instantiation indicates the media aspects, the MSE configuration comprising the MDD, and a specific implementation of the MCA, and the MSE microservice indicates the media aspects, the MSE configuration comprising the MDD, and a service API for the specific implementation of the MCA.

According to exemplary embodiments, the media aspects indicate any of service access information, consumption reporting, metrics reporting, dynamic policies, and network assistance. According to exemplary embodiments, the MDD indicates performance metrics and whether an MSE conforms to the media aspects.

According to exemplary embodiments, the at least one of the function and the service sets the configuration of the at least one of the SDK and the microservice through a same interface through which the at least one of the function and the service received information in determining that the at least one of the SDK and the microservice conforms to the MSE specification.

According to exemplary embodiments, the at least one of the function and the service sets the configuration of the at least one of the SDK and the microservice through a same interface through which the at least one of the function and the service received information in determining that the at least one of the SDK and the microservice conforms to the MSE specification.

According to exemplary embodiments, the determining that the at least one of the SDK and the microservice conforms to the MSE specification comprising determining that at least a format of an MSE description document (MDD) conforms to a format of the at least one of the SDK and the microservice.

According to exemplary embodiments, the generating the MSE configuration of the MSE specification of the 5G media streaming (5GMS) service comprises setting an identifier of an MSE.

According to exemplary embodiments, the information, received by the at least one of the function and the service, comprises the identifier of the MSE.

According to exemplary embodiments, the controlling the implementation of the 5GMS service according to the configuration of the at least one of the SDK and the microservice comprises indicating to the at least one of the function and the service that external to the implementation of the 5GMS service that the at least one of the function and the service can optionally request a status of the 5GMS service.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
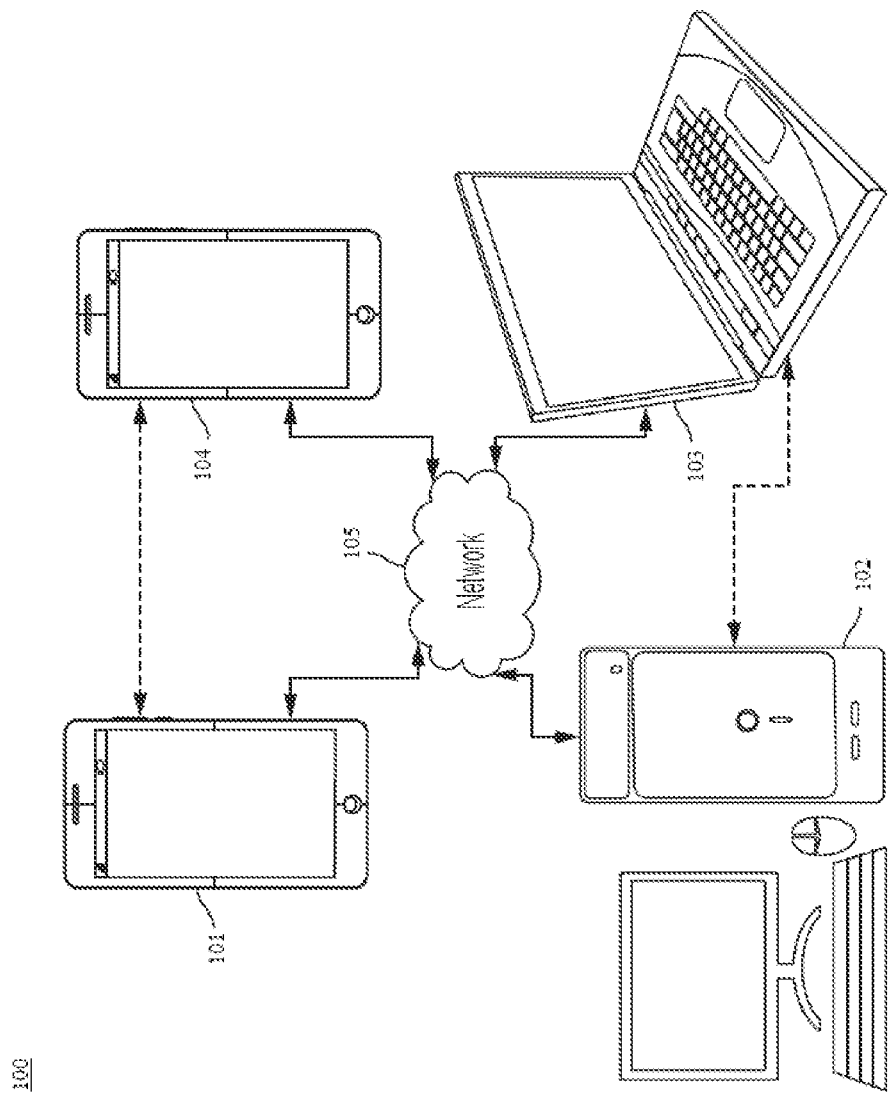
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
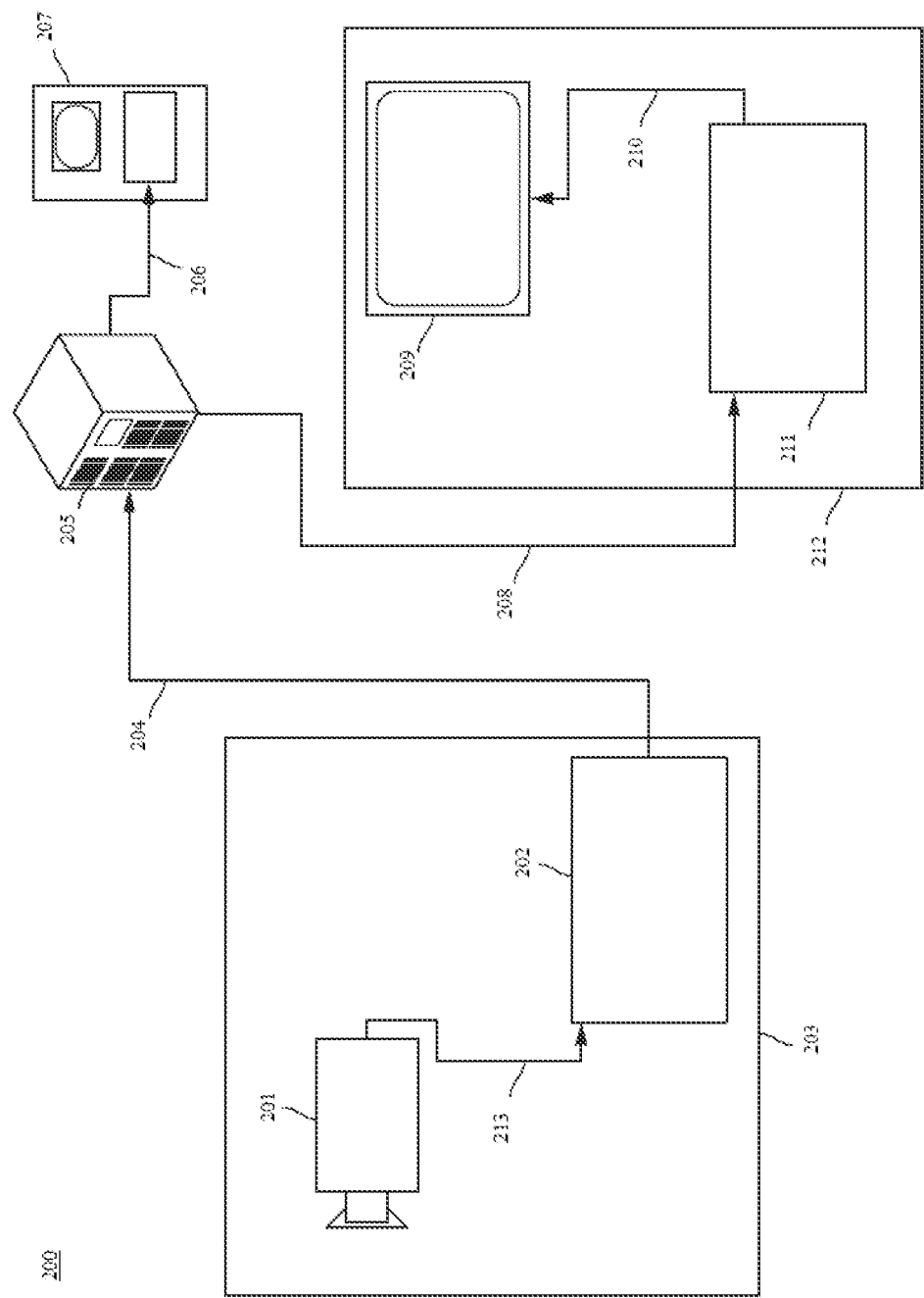
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
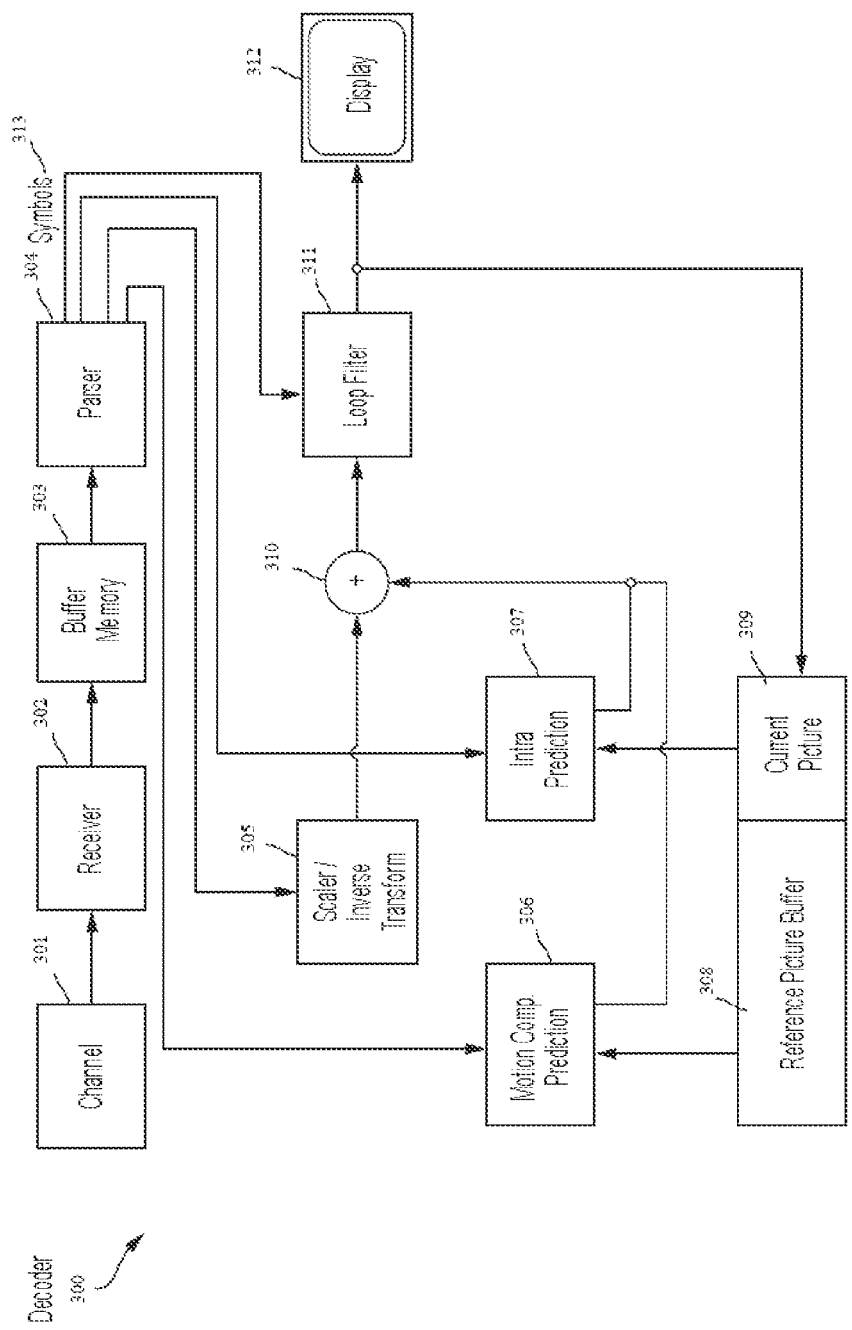
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the display 312, which may be a render device, as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
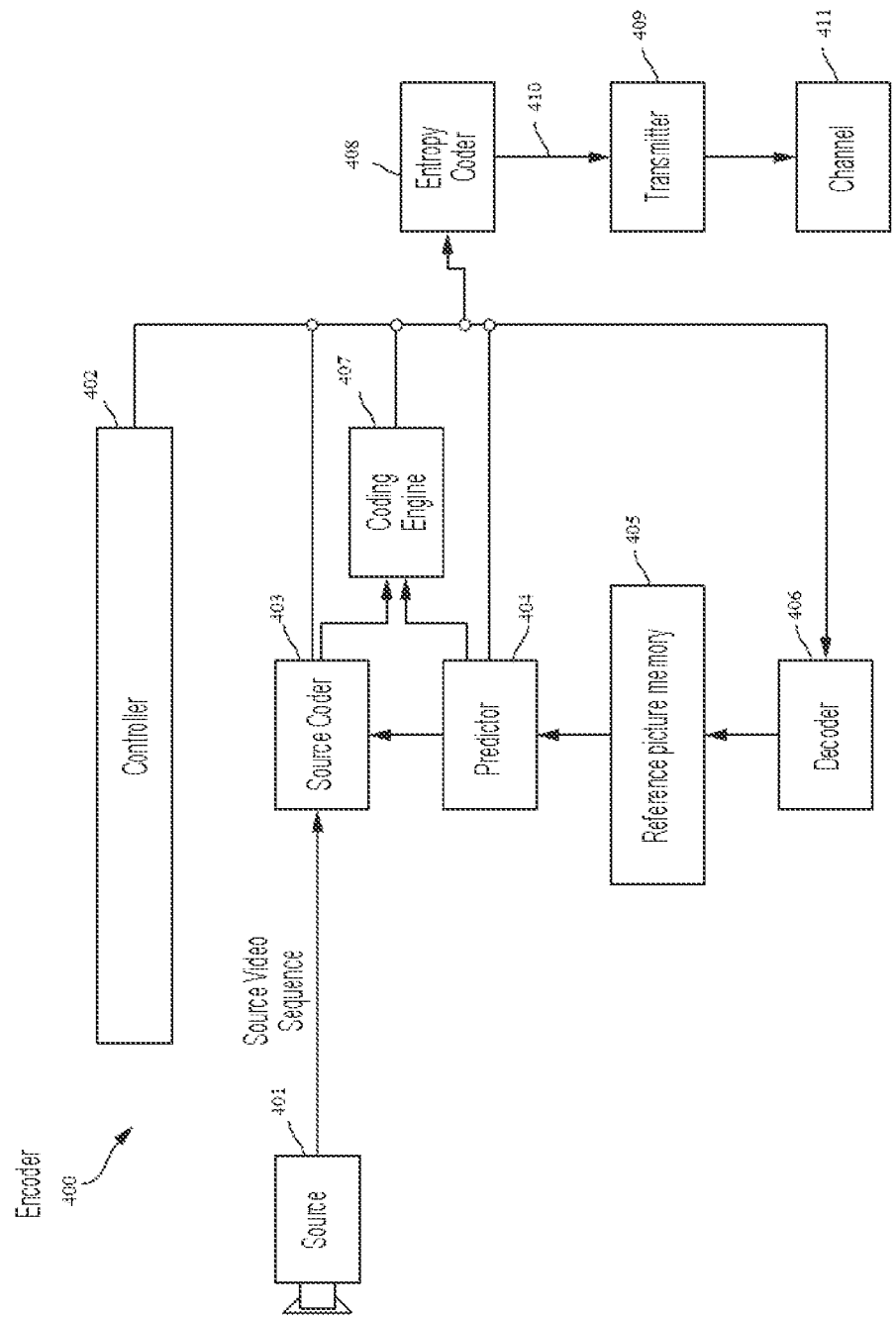
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder (for example a source coder 403) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405. which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
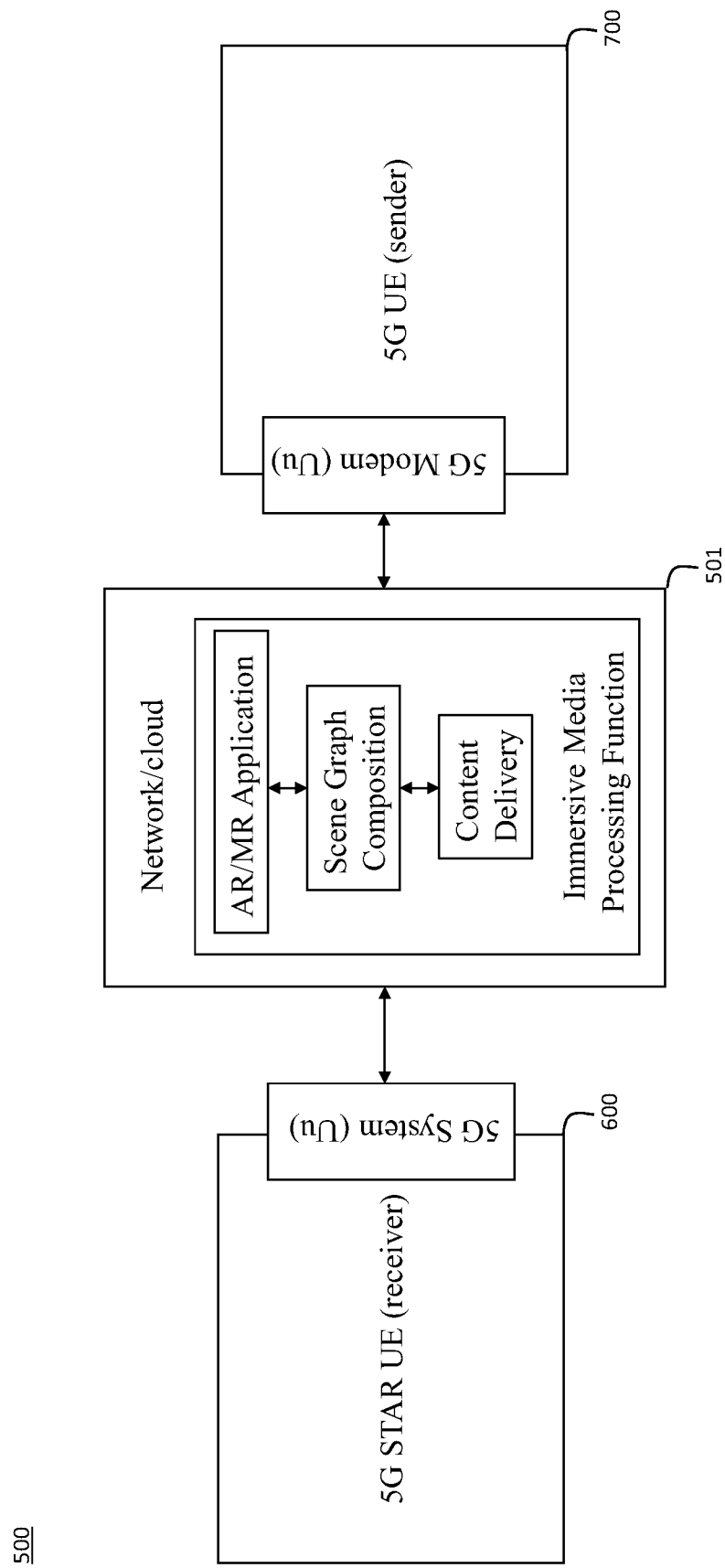
FIG. 5 is a simplified block diagram in accordance with embodiments.
Figure 6:
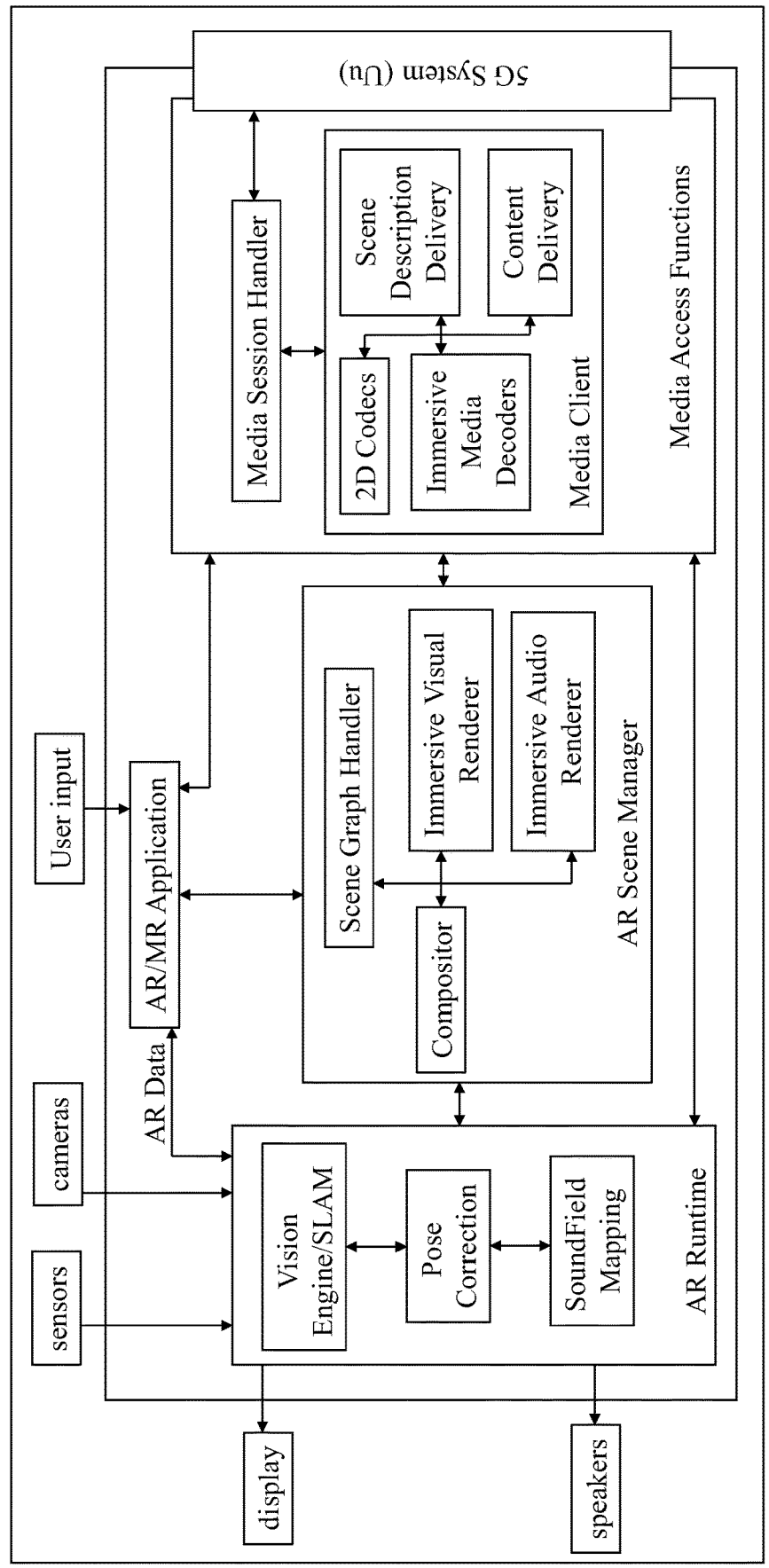
FIG. 6 is a simplified block diagram in accordance with embodiments.
Figure 7:
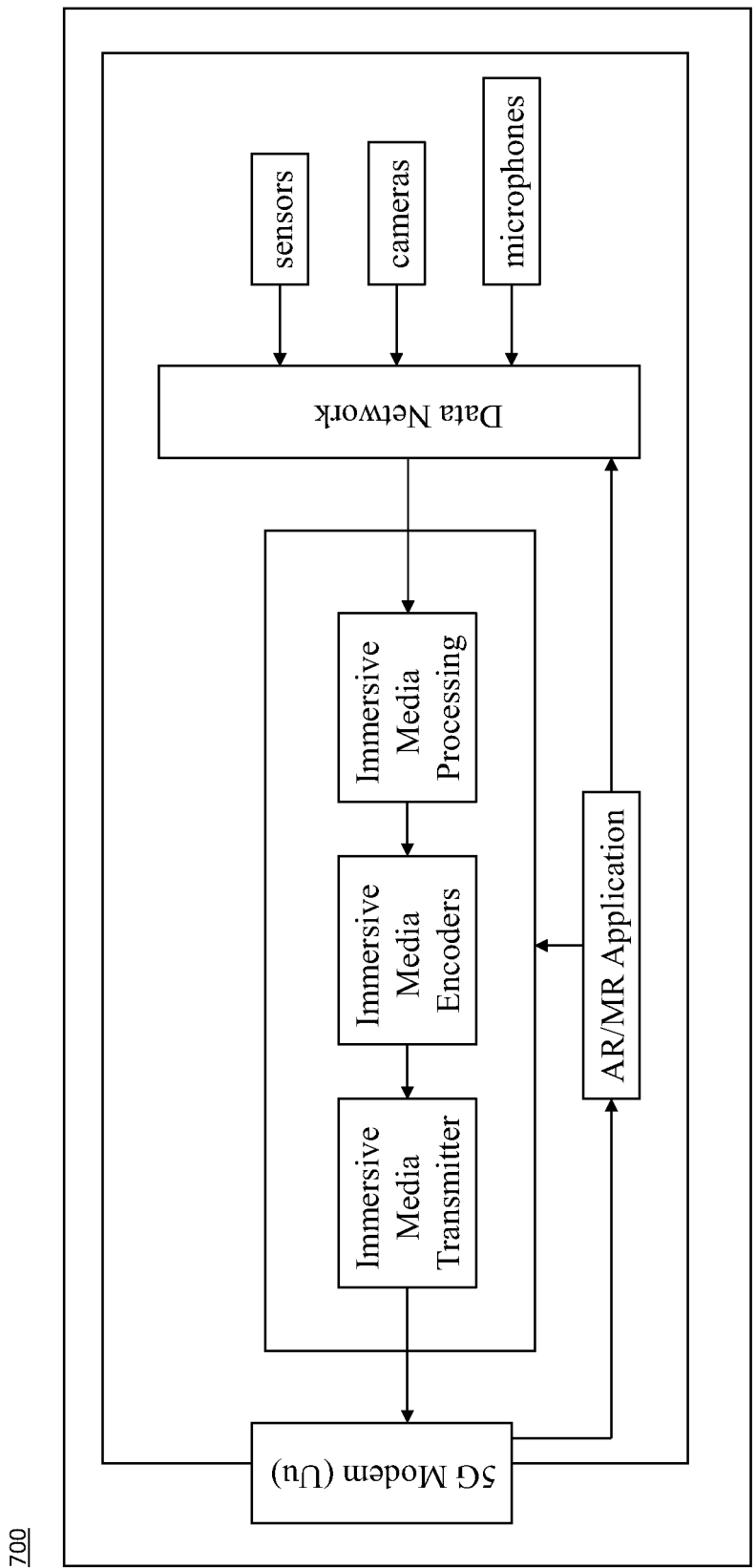
FIG. 7 is a simplified block diagram in accordance with embodiments.

FIG. 5 is an example 500 of an end-to-end architecture for a stand-alone AR (STAR) device according to exemplary embodiments showing a 5G STAR user equipment (UE) receiver 600, a network/cloud 501, and a 5G UE (sender) 700. FIG. 6 is a further detailed example 600 of one or more configurations for the STAR UE receiver 600 according to exemplary embodiments, and FIG. 7 is a further detailed example 700 of one or more configurations for the 5G UE sender 700 according to exemplary embodiments. 3GPP TR 26.998 defines the support for glass-type augmented reality/mixed reality (AR/MR) devices in 5G networks. And according to exemplary embodiments herein, at least two device classes are considered: 1) devices that are fully capable of decoding and playing complex AR/MR content (Stand-alone AR or STAR), and 2) devices that have smaller computational resources and/or smaller physical size (and therefore battery), and are only capable of running such application if the large portion of computation is performed on 5G edge server, network or cloud rather than on the device (Edge dependent AR or EDGAR).

And according to exemplary embodiments, as described below, there may be experienced a shared conversational use case in which all participants of a shared AR conversational experience have AR devices, each participant sees other participants in an AR scene, where the participants are overlays in the local physical scene, the arrangement of the participants in the scene is consistent in all receiving devices, e.g., the people in each local space have the same position/seating arrangement relative to each other, and such virtual space creates the sense of being in the same space but the room varies from participant to participant since the room is the actual room or space each person is physically located.

For example according to the exemplary embodiments shown with respect to FIGS. 5-7, an immersive media processing function on the network/cloud 501 receives the uplink streams from various devices and composes a scene description defining the arrangement of individual participants in a single virtual conference room. The scene description as well as the encoded media streams are delivered to each receiving participant. A receiving participant's 5G STAR UE 600 receives, decodes, and processes the 3D video and audio streams, and renders them using the received scene description and the information received from its AR Runtime, creating an AR scene of the virtual conference room with all other participants. While the virtual room for the participants is based on their own physical space, the seating/position arrangement of all other participants in the room is consistent with every other participant's virtual room in this session.

Figure 8:
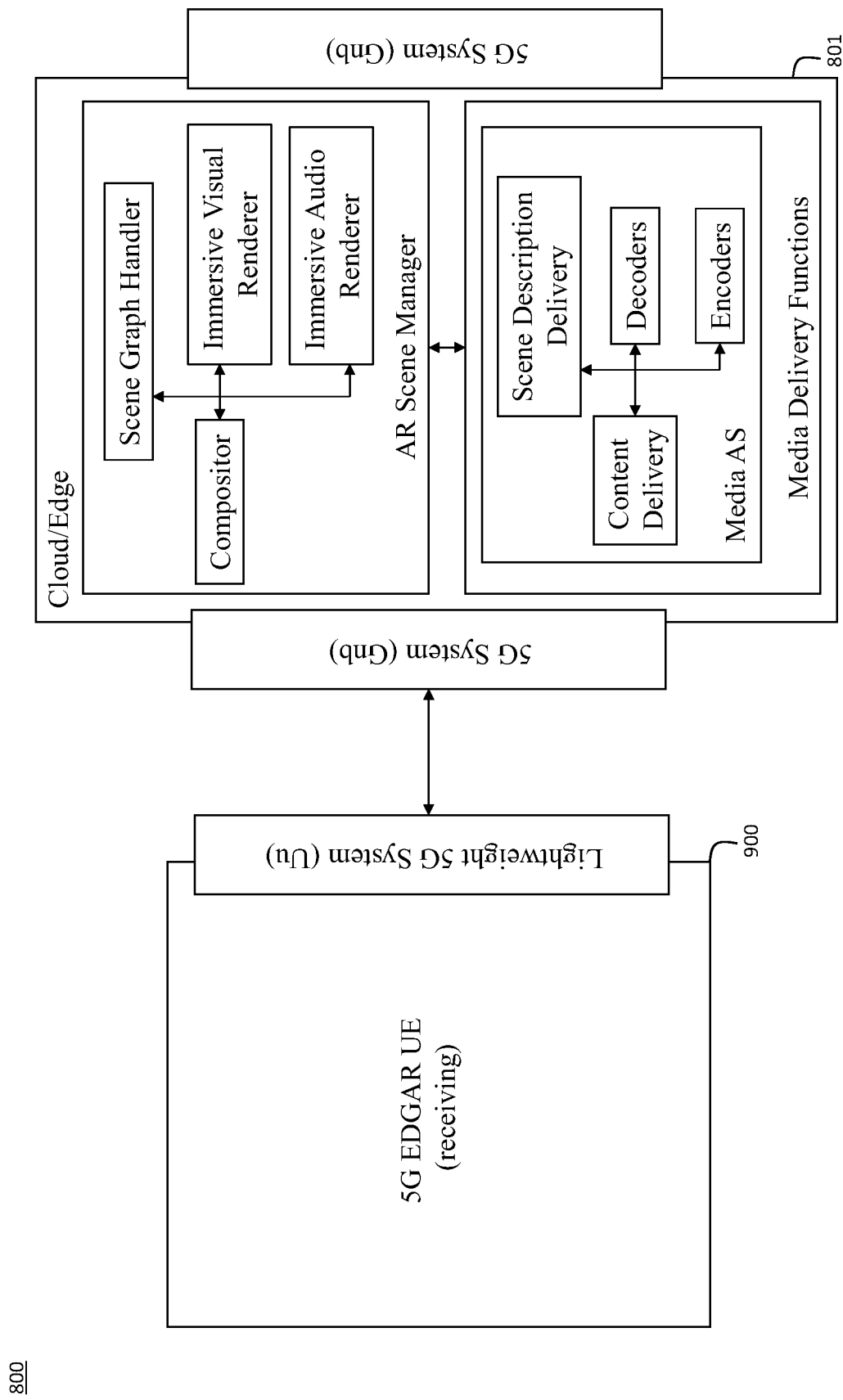
FIG. 8 is a simplified block diagram in accordance with embodiments.
Figure 9:
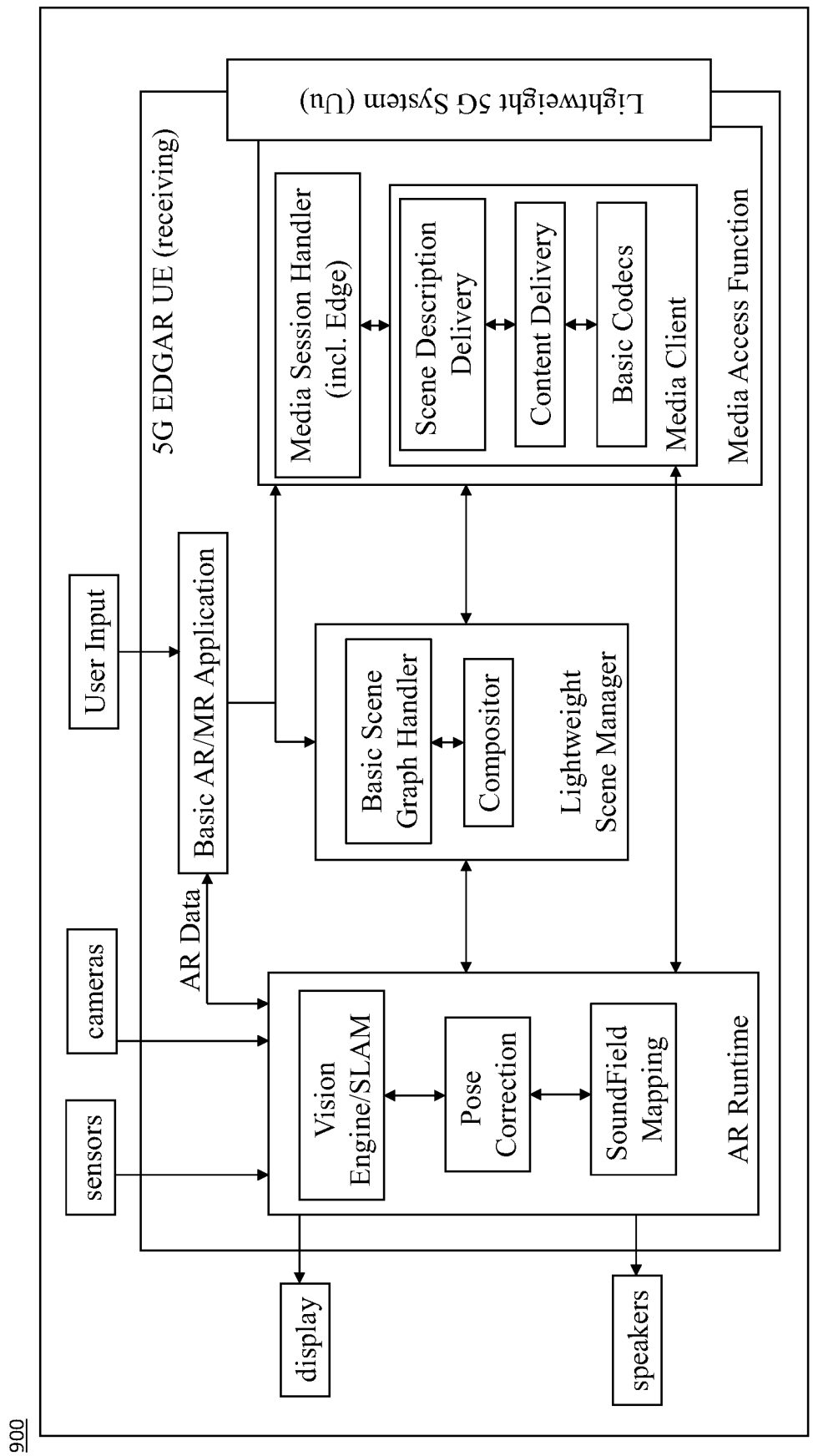
FIG. 9 is a simplified block diagram in accordance with embodiments.

According to exemplary embodiments, see also FIG. 8 showing an example 800 regarding an EDGAR device architecture, where the device, such as the 5G EDGAR UE 900, itself is not capable of heavy processing. Therefore, the scene parsing and media parsing for the received content is performed in the cloud/edge 801, and then a simplified AR scene with a small number of media components is delivered to the device for processing and rendering. FIG. 9 shows a more detailed example of the 5G EDGAR UE 900 according to exemplary embodiments.

Figure 10:
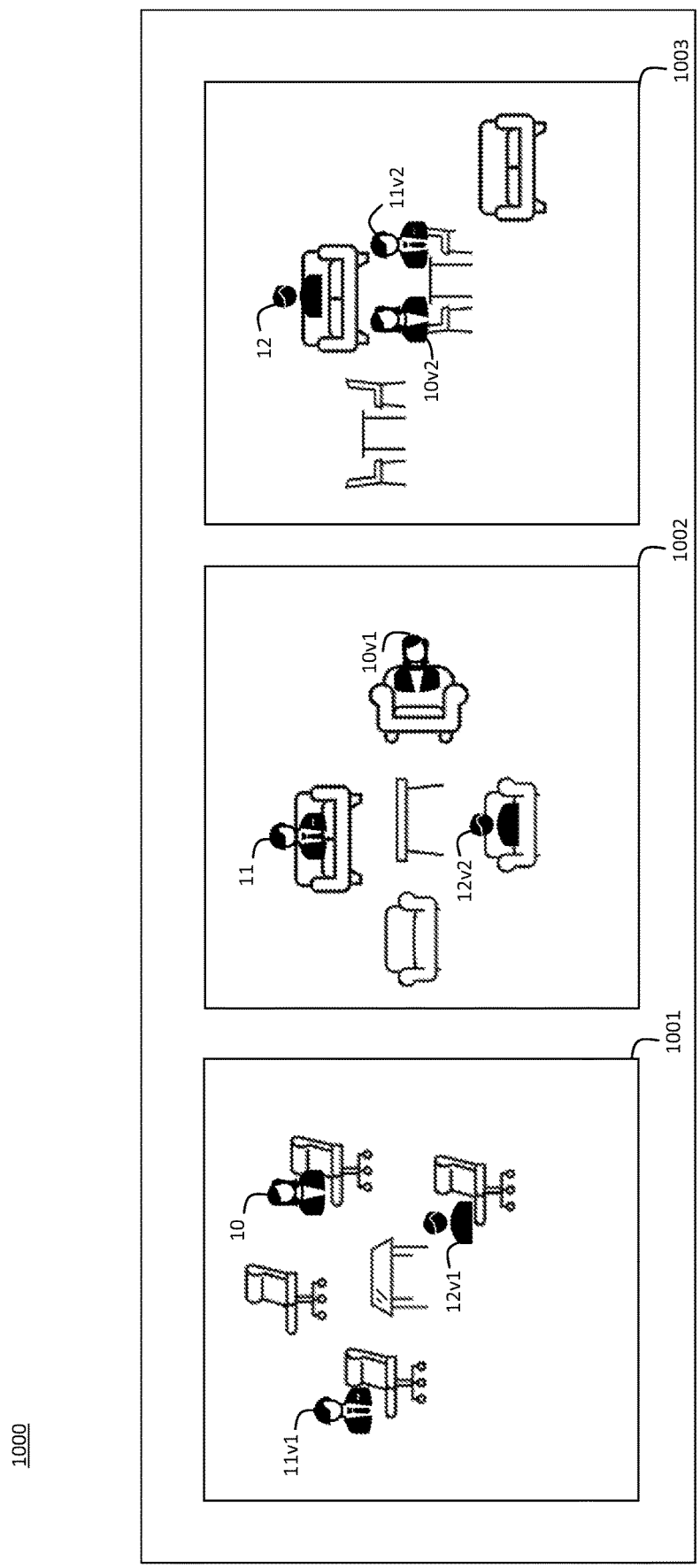
FIG. 10 is a simplified diagram in accordance with embodiments.

FIG. 10 shows an example 1000 in which user A 10, user B 11 and user T 12 are to participate in an AR conference room, and one or more of the users may not have an R device. As shown, user A 10 is in their office 1001, sitting in a conference room with various numbers of chairs, and user A 10 is taking on of the chairs. User B 11 is in their living room 1002, sitting on a love seat, there is also one or more couches for two people in his living room as well as other furniture such as a chair and table. User T 12 is at an airport lounge 1003, on a bench with a bench across a coffee table among one or more other coffee tables.

And see in the AR environment where in the office 1001, the AR of user A 10 shows to that user A 10 a virtual user B 11v1, corresponding to user B 11, and a virtual user T 12v1, corresponding to user T 12, and such that the virtual user B 11v1 and virtual user T 12v1 are shown to user A 10 as sitting on the furniture, office chairs, in the office 1001 as is the user A 10. And see in the living room 1202 in the example 1200 in which the AR for user B 11 shows the virtual user T 12v2, corresponding to the user T 12 but sitting on a couch in the living room 1202, and a virtual user A 10v1 corresponding to the user A 10 also sitting on furniture in the living room 1202 rather than the office chair in office 1201. See also in the airport lounge 1203 where the AR for the user T12 shows a virtual user A 10v2, corresponding to the user A 10 but sitting at a table at the airport lounge 1203, and a virtual user B 11v2 also sitting at the table across from virtual user A 10v2. And in each of those office 1201, living room 1202, and airport lounge 1203, the updated scene description of each room is consistent with other rooms in terms of position/seating arrangements. For example, user A 10 is shown as relatively counter-clockwise to user 11 or virtual representations thereof who is also relatively clockwise to user T 12 or virtual representations thereof per room.

But AR technology has been limited in any attempts to incorporate creation and use of virtual spaces for devices that do not support AR but can parse VR or 2D video, and embodiments herein provide for improved technological procedure for creating a virtual scene consistent with the AR scene when such devices participated in the shared AR conversational services.

Figure 11:
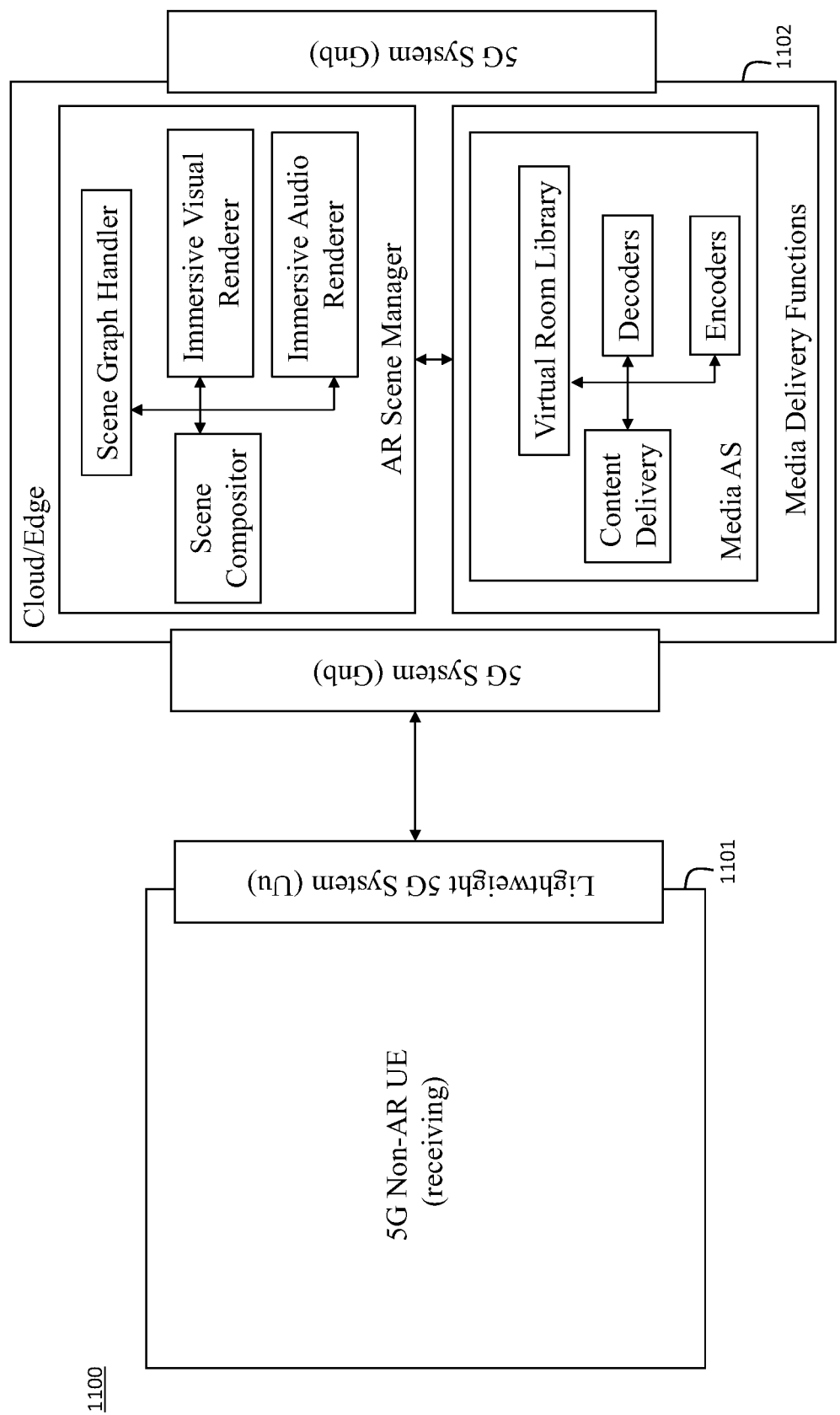
FIG. 11 is a simplified block diagram in accordance with embodiments.

FIG. 11 shows an example 1100 of an end-to-end architecture with a non-AR device 1101 according to exemplary embodiments and a cloud/edge 1102. And FIG. 12 shows a further detailed block diagram example of the non-AR device 1101.

Figure 12:
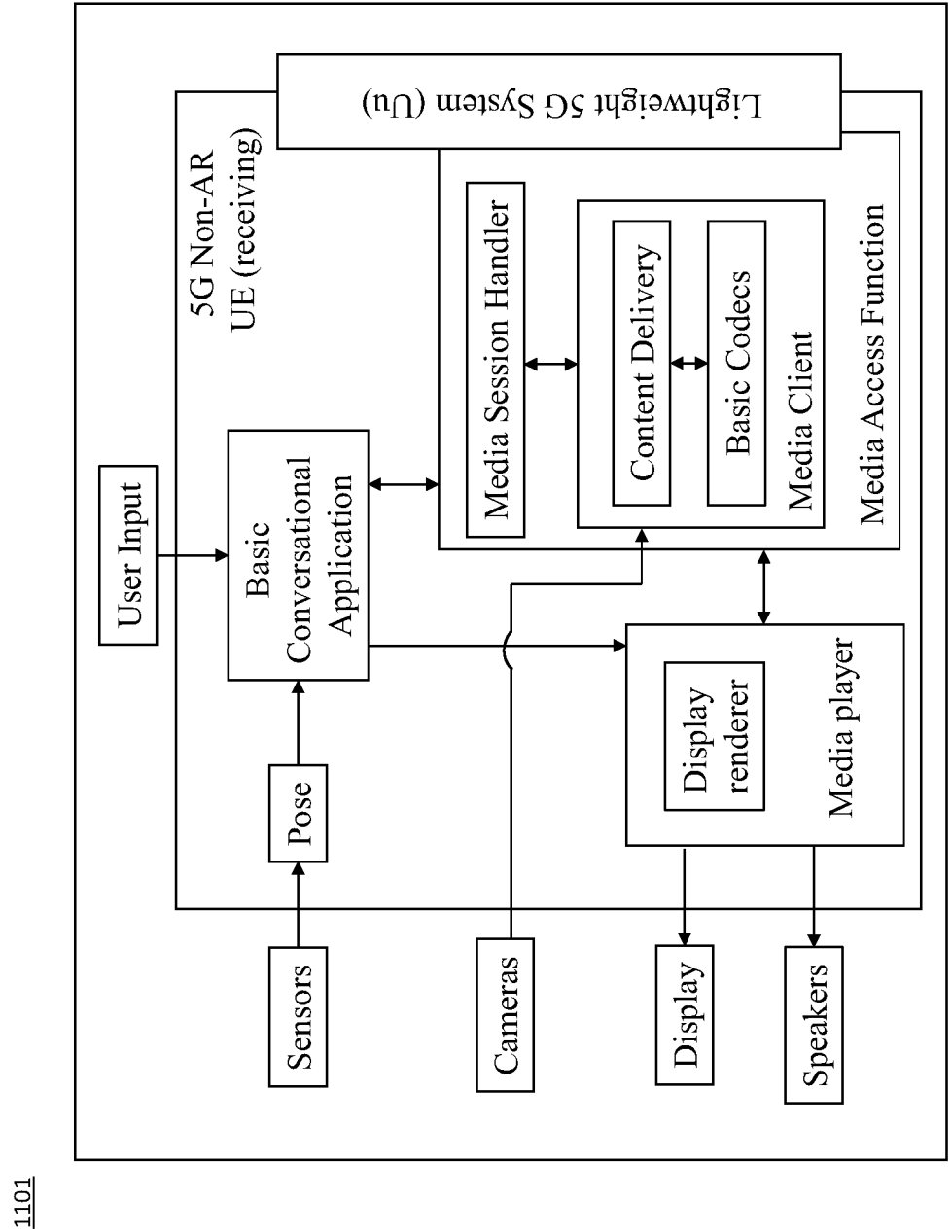
FIG. 12 is a simplified block diagram in accordance with embodiments.

As is shown FIGS. 11 and 12, the non-AR UE 1101 is a device capable of rendering 360 video or 2-D video but does not have any AR capabilities. However, the edge function on the cloud/edge 1102 is capable of AR rendering of the received scene, rendering scene, and the immersive visual and audio object in a virtual room selected from the library. Then the entire video is encoded and delivered to the device 1101 for decoding and rendering.

As such, there may be multiview capabilities such as where AR processing on edge/cloud 1102 may generate multiple videos of the same virtual room: from different angles and with different viewports. And the device 1101 can receive one or more of these videos, switching between them when desired, or sends commands to the edge/cloud processing to only stream the desired viewport/angle.

Also, there may be changing the background capability, where the user on the device 1101 can select the desired room background from the provided library, e.g one of different conference rooms, or even living rooms and layouts. And the cloud/edge 1102 uses the selected background and creates the virtual room accordingly.

Figure 13:
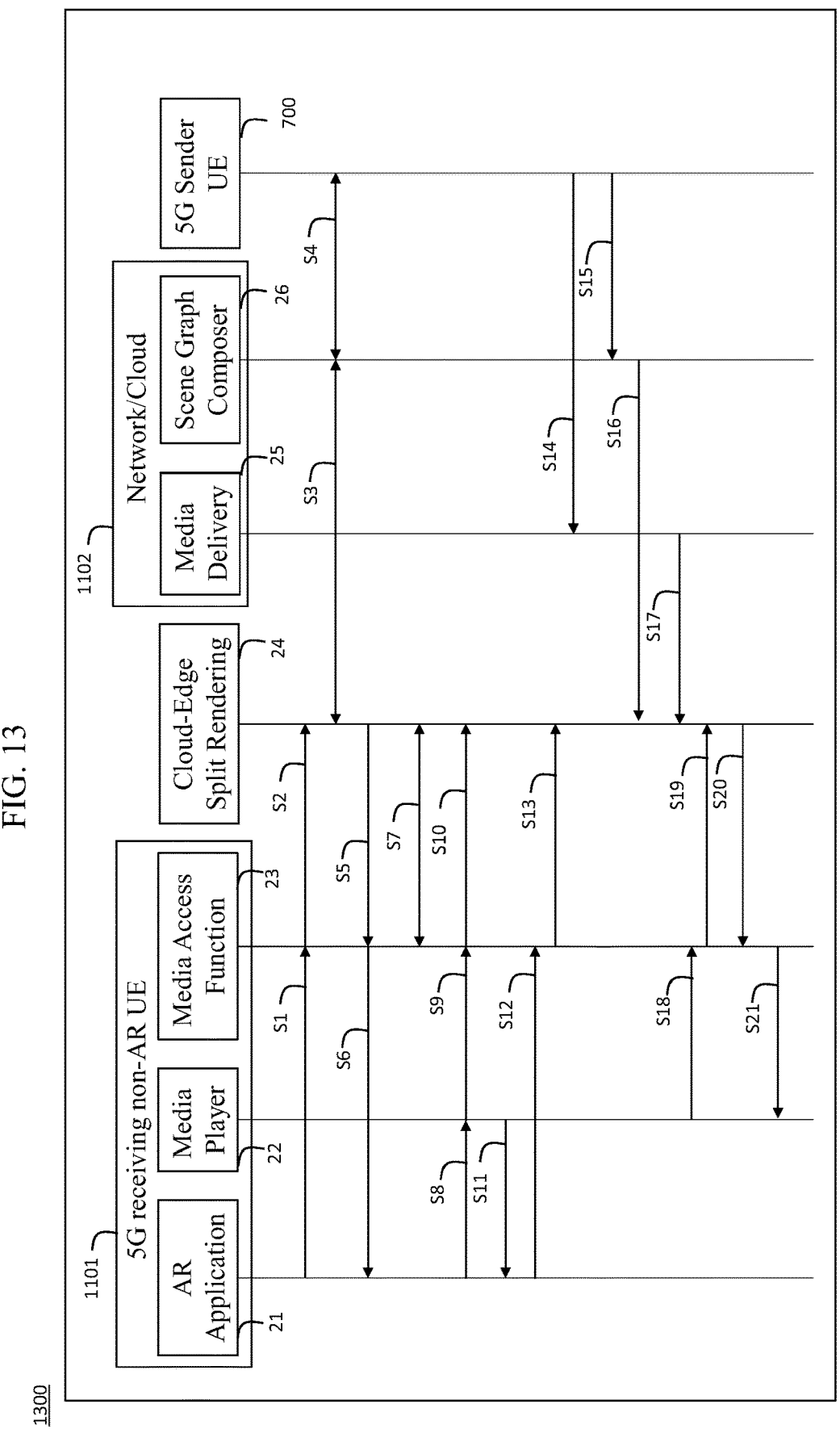
FIG. 13 is a simplified block and timing diagram in accordance with embodiments.

FIG. 13 illustrates an example timing diagram 1300 for an example call flow for an immersive AR conversational for a receiving non-AR UE 1101. For illustrative purposes, only one sender is shown in this diagram without showing its detailed call flow.

There is shown an AR application module 21, a media play module 22, and a media access function module 23 which may be considered to be modules of the receiving non-AR UE 1101. There is also shown a cloud/edge split rendering module 24. There is also shown a media delivery module 25 and a scene graph composer module 26 each of the network cloud 1102. There is also shown a 5G sender UE module 700.

S1-S6 may be considered a session establishment phase. The AR application module 21 may request to start a session to the media access function module 23 at S1, and the media access function module 23 may request to start a session to the cloud/edge split rendering module 24 at S2.

The cloud/edge split rendering module 24 may implement session negotiation at S3 with the scene graph composer module 26 which may accordingly negotiate with the 5G sender UE 700. If successful, then at S5, the cloud/edge split-rendering module may send an acknowledgement to the media access function module 23, and the media access function module 23 may send an acknowledgement to the AR application module 21.

Afterwards, the S7 may be considered to be a media pipeline configuration stage in which the media access function module 23 and the cloud/edge split-rendering module 24 each configure respective pipelines. And then, after that pipeline configuration, a session may be started by a signal at S8 from the AR application module to the media player module 22, and from the media player module 22 to the media access function module 23 at S9, and from the media access function module 23 to the cloud/edge split-rendering module 24 at S10.

Then there may be a pose loop stage from S11 to S13 in which at S11, pose data may be provided from the media player module 22 to the AR application module 21, and at S12, the AR application module may provide pose data 12 to the media access function module 23 after which the media access function module 23 may provide pose data to the cloud/edge split-rendering module 24.

S14 to S16 may be considered to be a shared experience stream stage in which at S14 the 5G sender UE 700 may provide media streams at S14 to the media delivery module 25 and AR data to the scene graph compositor module 26 at S15. Then the scene graph compositor module 25 may compose one or more scenes based on the received AR data and at S16 provide scene and scene updates to the could/edge split-rendering module 24, and also the media delivery module 25 may provide media streams to the cloud/edge split-rendering module at S17. This may include obtaining an AR scene descriptor from the non-AR device that does not render an AR scene and generating a virtual scene by a cloud device by parsing and rendering the scene description obtained from the non-AR device according to exemplary embodiments.

S18 to S19 may be considered to be a media uplink stage in which the media player module 22 captures and processes media data from its local user and provides, at S18, that media data to the media access function module 23. Then the media access module 23 may encode the media and provide, at S19, media streams to the cloud/edge split-rendering module 24.

Between S19 and S20 may be considered a media downlink stage in which the cloud/edge split-rendering module 24 may implement scene parsing and complete AR rendering after which, S20 and S21 may be considered to make up a media stream loop stage. At S20, the cloud/edge split-rendering module 24 may provide media streams to the media access function module 23 which may then decode the media and provide, at S21, media rendering to the media player 22.

By such features according to exemplary embodiments, the non-AR UE 1101, even though not having a see-through display and therefore not able to create an AR scene, nonetheless, can take advantage of its display that can render VR or 2-D video. As such, its immersive media processing function only generates a common scene description, describing the relative position of each participant to others and the scene. The scene itself needs to be adjusted with pose information at each device before being rendered as an AR scene as described above. And AR rendering process on edge or cloud can parse an AR scene and create the simplified VR-2D scene.

According to exemplary embodiments, this disclosure uses similar split-rendering processing of an EDGAR device for a non-AR device, such as a VR or 2-d video device, with characteristics such as the edge/cloud AR rendering process in this case does not produce any AR scene. Instead, it generated a virtual scene, by parsing and rendering the scene description received from the immersive media processing function for a given background (such as a conference room) and then renders each participant in the location described by the scene description in the conference room.

Also, the resulting video can be a 360 Video or a 2-D video depending on the capabilities of the receiving non-AR device, and the resulted video is generated considering the pos-information received from the non-AR device according to exemplary embodiments.

Also, each other participant with a non-AR device is added as a 2-D video overlay on the 360/2D video of the conference room, such as shown in FIG. 10, and the room may have regions that are dedicated to being used these overlays such as ones of the furniture where the virtual images are overlaid as shown in FIG. 10.

Also, the audio signals from all participants may be mixed if necessary to create single-channel audio that carries the voice in the room, the video may be encoded as a single 360 video or 2-D video and delivered to the device, and optionally, multiple video (multi-view) sources can be created, each of which captures the same virtual conference room from a different view and provide those views to the device according to exemplary embodiments.

Further, the non-AR UE device 1101 can receive the 360 video and/or one or more multi-view videos of choice along with audio and renders on the device display, and the user may switch between different views, or by moving or rotating the view device, change the viewport of the 360-video and therefore be able to navigate in the virtual room while viewing the video.

Although embodiments described above are provided with such 5G media stream architecture (5GMS) extensions to use the edge servers in their architectures, and while a specification thereof may have many features, such features have been technically unable to be deployed as a set of software development kits (SDKs) on a device or as a set of microservices on the cloud, and such technical deficiency is addressed by embodiments described further below.

For example, the current media service enabler technical report does not define a framework that relates the specification to SDKs and does not include any notion of microservices.

Figure 14:
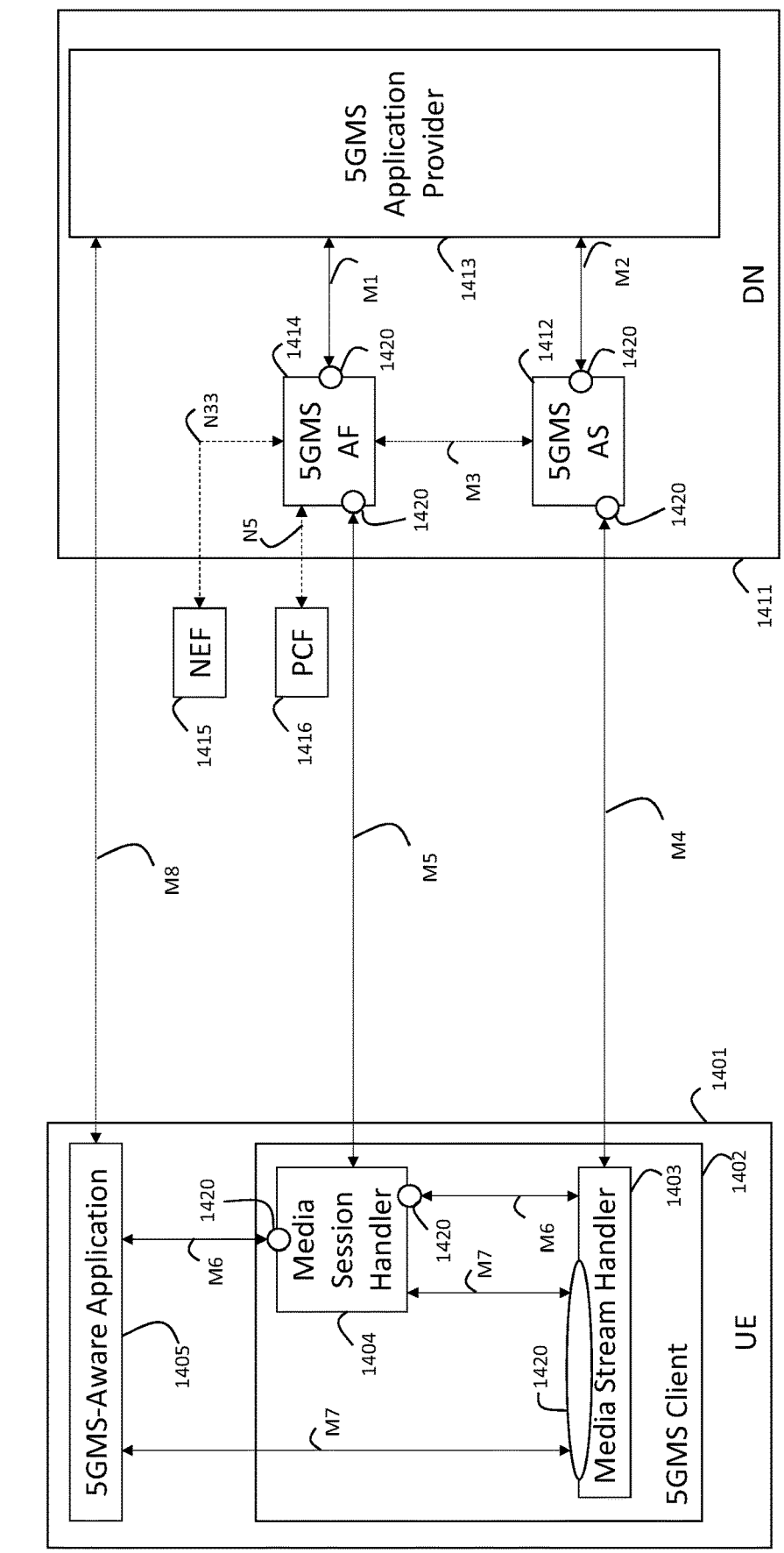
FIG. 14 is a simplified block diagram in accordance with embodiments.

See the example 1400 of FIG. 14 showing a 5G media streaming architecture with edge extensions according to exemplary embodiments. As shown, there is a user equipment (UE) 1401 and a data network (DN) 1411. The UE 1401 may include a 5GMS client 1403 and a 5GMS-aware application 1405, such as the AR or non-AR embodiments described above those such applications are not limited thereto. The 5GMS client 1403 may also include a media stream handler 1403 and a media session handler. The DN 1411 may include a 5GMS application server (AS) 1412, a 5GMS application function (AF) 1414, and a 5GMS application provider 1413. The 5GMS AF 1414 may also be in communication with a network exposure function (NEF) 1415 and policy and charging function (PCF) 1416. Improvements described herein may be understood in the context of at least any one or more of the UE 1401, 5GMS aware application 1405, 5GMS application provider 1413, the NEF 1415 and the PCF 1416; that is, rather than having a monolithic specification that is absent definitions of the media service enabler (MSE) for each function or group of function, one or more of those elements may generate its own specification and, upon a conforming request provide such specification to another of those elements which may in turn further configure that initial elements specification depending on various possibilities such as those described further below, and such processing may be through any one or more of the shown multiple exposed application programming interfaces (APIs) 1420 and interfaces M1, M2, M4, M5, M6, M7, M8, N33, and N5.

Figure 15:
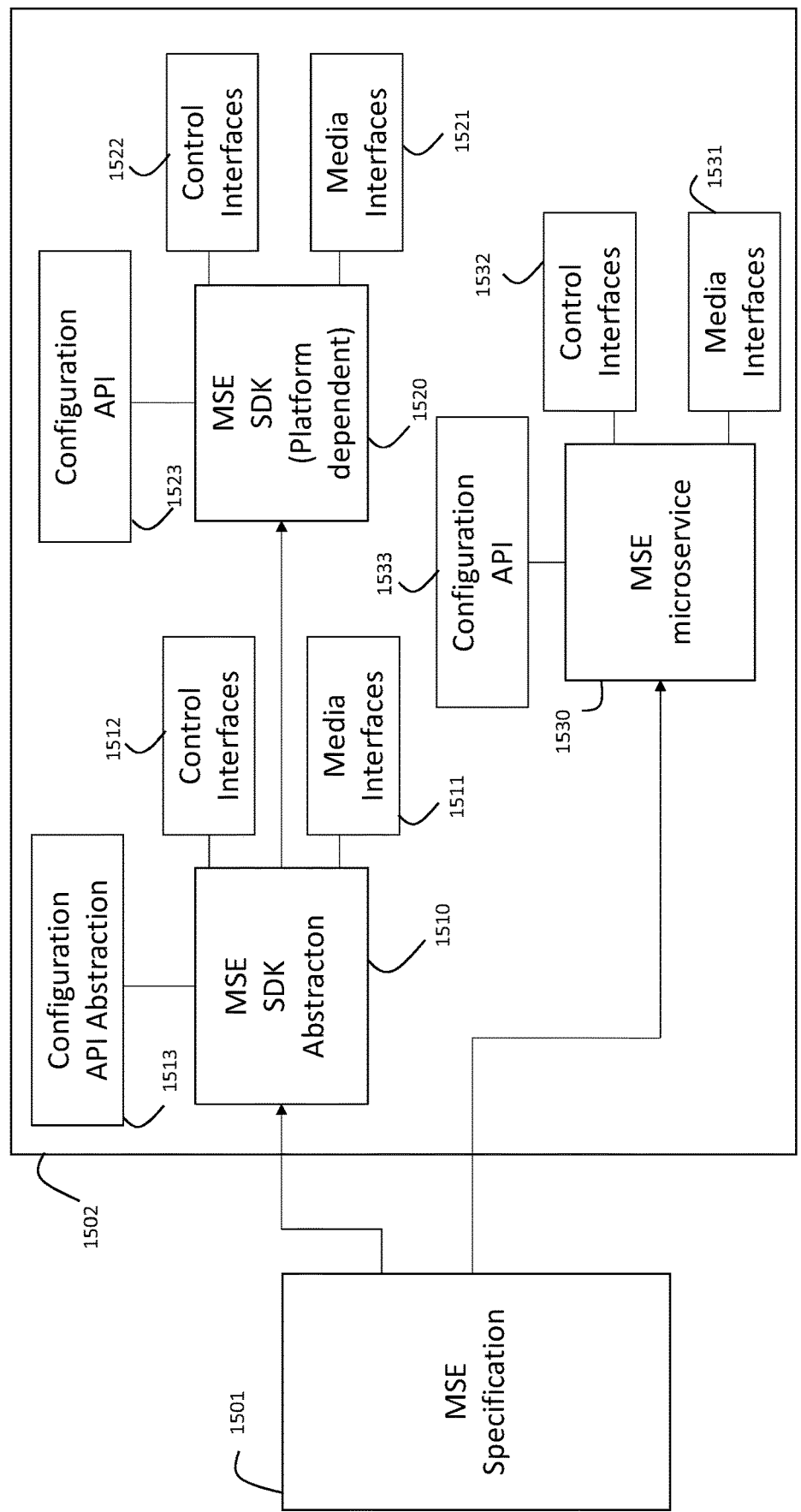
FIG. 15 is a simplified block diagram in accordance with embodiments.

According to exemplary embodiments, FIG. 15 shows example 1500 of a MSE framework in two parts, an MSE specification 1501 and an MSE implementation 1502 including an MSE SDK abstraction 1510, and MSE SDK (platform dependent) instantiation 1520, and an MSE microservice 1530. The MSE SDK abstraction 1510 may have configuration API abstraction 1513, control interfaces 1512, and media interfaces 1511 that each may inform the configuration API 1523 of the MSE SDK (platform dependent) instantiation 1520 and its control interfaces 1522 and media interfaces 1521. The MSE microservice 1530 may also have configuration API 1533, control interfaces 1532, and media interfaces 1531.

According to exemplary embodiments, the MSE specification 1501, herein an "MSE Specification", defines (a) media aspects and (b) MSE configuration, and such definitions and use thereof provide for such technical advantages described herein. The (a) media aspects may indicate any of (i) functional description of the MSE including mandatory and optional features, (ii) control interfaces such as provisioning, authentication that is used by the application, and other functions to interact with this MSE, (iii), media interfaces that includes all inputs and outputs format and protocols, (iv) network interface including system and radio network, (v) event, notifications, reporting, and monitoring, and (vi) error handling. The (b) MSE configuration, herein an "MSE configuration" indicates any of (i) an MSE description document (MDD) (that describes (1) functions supported by an MSE implementation and their configuration parameters, and (2) optionally the performance/cost metrics for the different features/options), (ii) an MSE Configuration API (MCA) abstraction (indicating information for (1) retrieving the description document, (2) configuring the MSE instantiation, and (3) retrieving the state and status of the MSE instantiation), and (iii) a service API for that MSE Configuration API (MCA) abstraction. The MSE implementation 1502 may include any of (a) the MSE SDK abstraction 1510 (which indicates (i) media aspects, conforming to the media aspects of the MSE specification 1501, and (ii) the MSE description document (MDD) and the MSE Configuration API (MCA) abstraction of the above-described MSE configuration of the MSE Specification 1501), (b) the MSE SDK (platform dependent) instantiation 1520 (which indicates an SDK implementation in a specific environment and conforms to the following: (i) media aspects, conforming to the media aspects of the MSE specification 1501, and (ii) the MSE description document (MDD) and, unlike the MSE SDK abstraction 1530, only a specific the MSE Configuration API (MCA) abstraction of the above-described MSE configuration of the MSE Specification 1501), and (c) the MSE microservice 1510 which is the MSE implementation as a microservice and indicates (i) media aspects, conforming to the media aspects of the MSE specification 1501, and a service API for the MSE Configuration API (MCA) abstraction for the MSE description document (MDD) and the MSE Configuration API (MCA) abstraction of the above-described MSE configuration of the MSE Specification 1501. Determining conformance may be by matching formats or syntax for example or by a flag indicating such format or syntax.

For example, according to such advantageous MSE specification, which is absent from the 3GPP SA4 specifications, for any SDK or microservice that is conforming to the MSE specification, a description of the features and their configuration parameters can be retrieved by an external function or service according to exemplary embodiments, the external function or service can set a specific configuration for running that SDK, and the state and status of the running SDK can be retrieved at any time. The state and status may indicate available, running, busy, idle, offline, etc.

Figure 16:
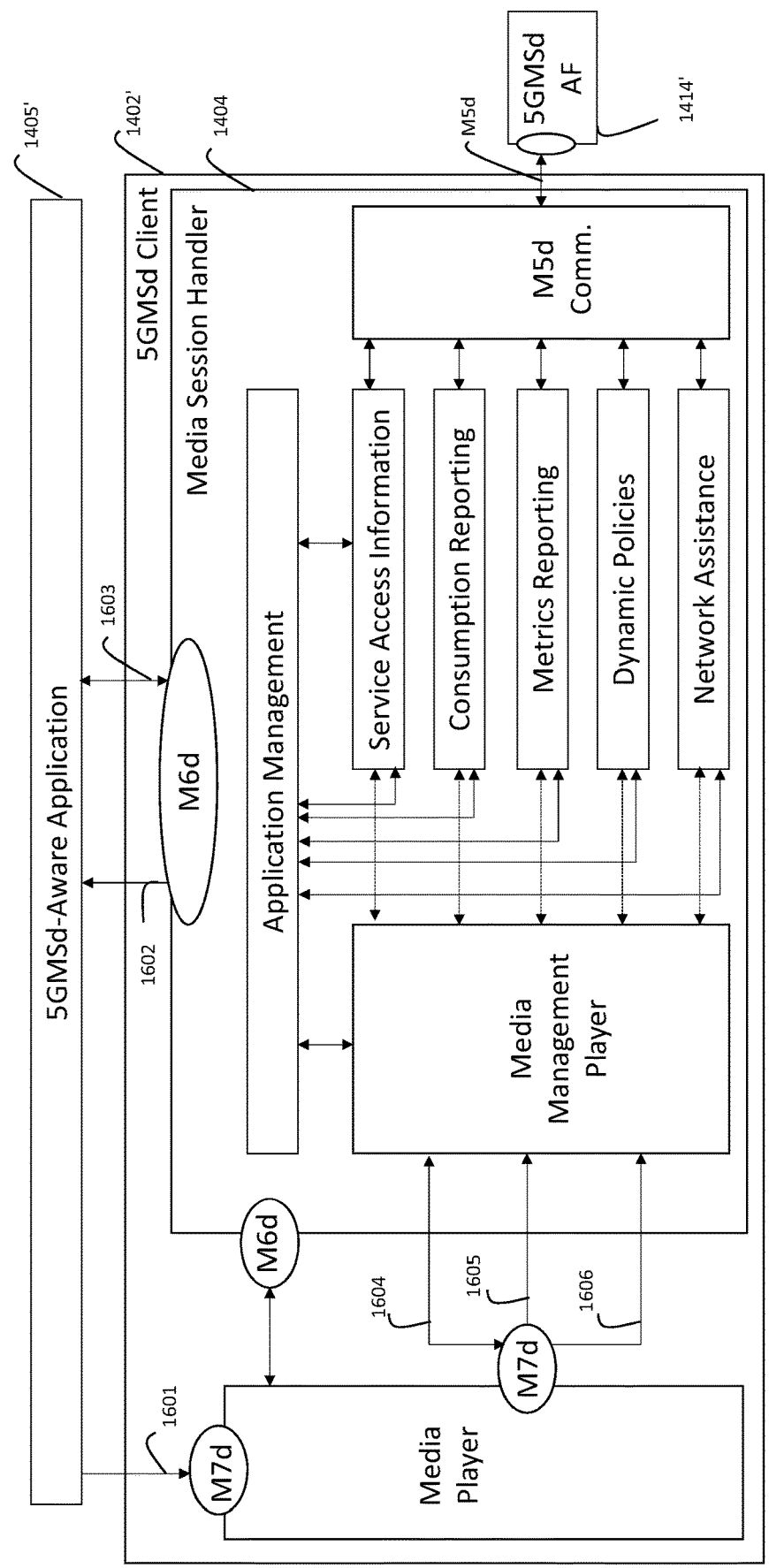
FIG. 16 is a simplified block diagram in accordance with embodiments.

In that light, FIG. 16 shows an exemplary embodiment implementation example 1600 in which there is a 5G Media Streaming downlink (5GMSd)-aware application 1405 in communication with a 5GMSd-client 1402' having therein a media session handler 1404 in communication with a 5GMSd AF 1414'. Methods 1601, notification and errors 1602, and status 1603 information may be communicated between the 5GMSd-aware application 1405' and the 5GMSd client 1402', status 1604, subscriptions and notifications 1605, and settings and configuration information 1606 may be communicated to and from the media session handler 1404 which itself may communicate to the 5GMSd AF 1414' via the link M5d. According to exemplary embodiments, a MSE specification for the Media Session Handler (MSH) example 1600 shown in FIG. 16 would describe (a) media aspects (such as (i) functional descriptions (of (1) service access information, (2) consumption reporting, (3) metrics reporting, (4) dynamic policies, and (5) network assistant information) and (ii) M5d, M6d, and M7d information) and (b) MSE configuration information such as (i) an MDD (which describes (1) an identifier that shows this MSE conforms to said media aspects, (2) option features of said functional descriptions and M5d, M6d, and M7d with their configuration parameters, and (3) optionally the performance/cost metrics for the different features/options), (ii) an API abstract (indicating information for (1) retrieving said description document MDD, (2) configuring the MSE instantiation, and (3) retrieving a state and status of the MSE instantiation), and (iii) a service API for said API abstract. For example, according to exemplary embodiments, an MSE SDK implementation of the above MSE specification, which could be in Android, would support the following (i) media aspects conforming to the above-noted media aspects of the MSE specification for the MSE and (ii) the above-noted MDD of the MSE configuration of the MSE specification and a specific implementation of the API abstract of the MSE configuration of the MSE Specification for the MSH.

Figure 17:
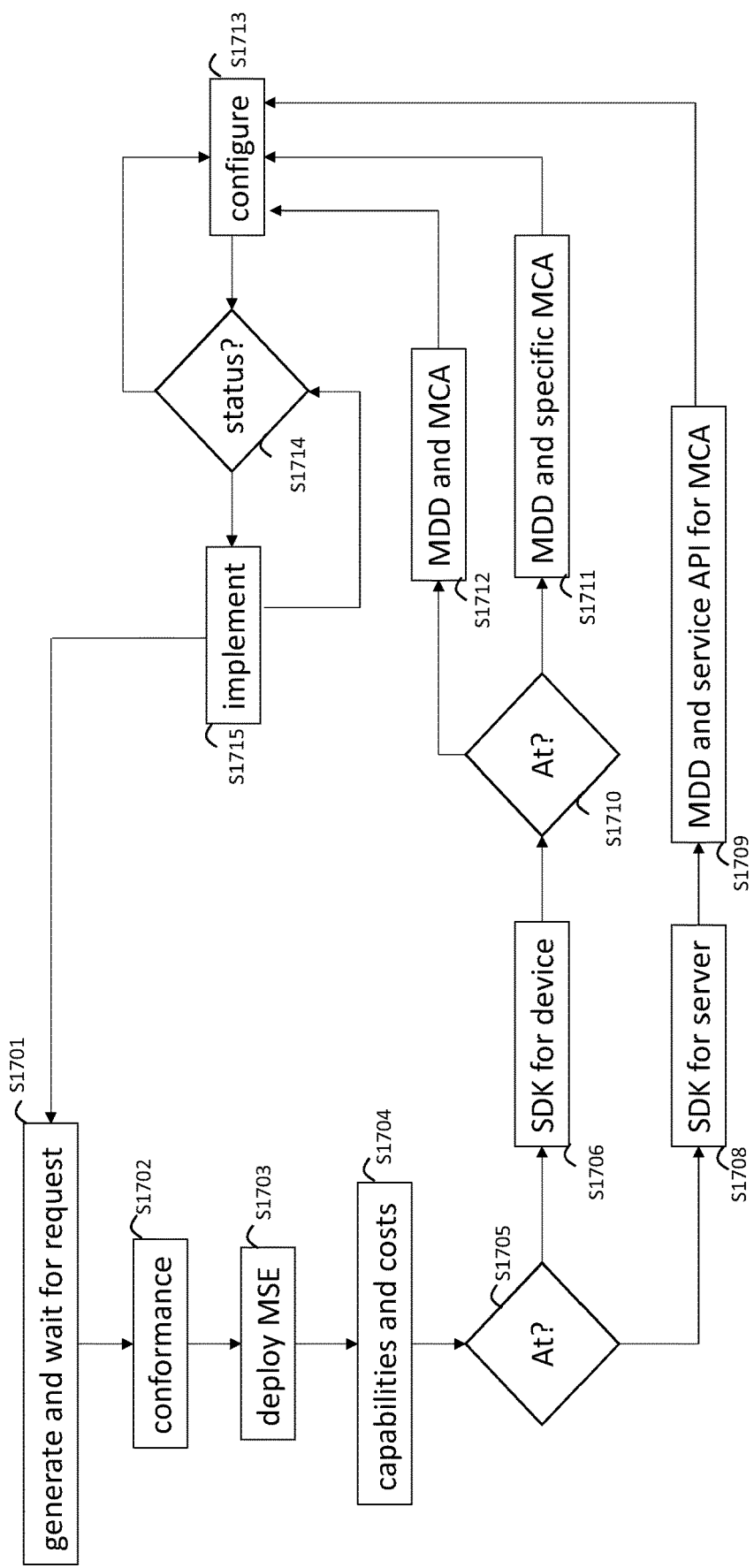
FIG. 17 is a simplified flow diagram in accordance with embodiments.

According to exemplary embodiments, see the flowchart 1700 of FIG. 17, where the MDD describes the features implemented by the MSE SDK. APIs of the MSE configuration noted above may allow an external Android process to retrieve this document at S1701 and configure the SDK at S1713 with a set of configurable parameters that are described in the MDD and the state and status of the running SDK, which may be determined at S1714. The language and syntax of MDD and the general framework of MCA can be defined at S1701 uniformly for all SA4 media service enabler specification and only specific codepoints for each specification is defined in that specification. An external function or application understanding MDD language and syntax, as well as supporting MCA, can retrieve the information at S1701 from an MSE implementation and if it recognizes the MSE specification identifier, at S1702, then the external function or application understanding can parse and process the MDD and its configuration parameters. For example, the MSE specification and its identifier may be generated at S1701, then after a request is made for such specification, a conformance check may determine whether a desired identifier is provided, afterwards, the MSE may be deployed according to the generated parameters at S1703 depending on various capabilities and cost indexing at S1704 to determine whether to, at S1705, to deploy the SDK at a device at S1706 or at a server at S1708 where, if at S1708 than the MDD and service API for MCA may be set as noted above, or if at S1710, then it may be determined whether to proceed with the MDD and MCA in general or the MDD and a specific MCA. Regardless, such SDK may then be configured at S1713 by the external device or function which may then request, at any time, a status S1714 according to the configured implementations at S1715.

An example of MDD can be found in ISO/IEC 23090-8. The function description document is a JSON document that describes the functionalities and features a function provides and its configuration parameters.

As such, exemplary embodiments provide a method for defining media service enabler SDK and services wherein the functionalities and features of a media service enabler are described in a document that can be retrieved by an external function, application, or service, as well as the configuration parameters for each feature, wherein the external entity can set up a specific configuration of the media service enabler using the same interface used for retrieving the information, wherein the complexity or other metric of various functions of the media service enabler, is also described in the document, wherein the media service enabler specification defines a format for the description document as well as a unique identifier to that specific media service enabler.

The techniques described above, can be implemented as computer software using computer-readable instructions and physically stored in one or more computer-readable media or by a specifically configured one or more hardware processors. For example, FIG. 18 shows a computer system 1800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
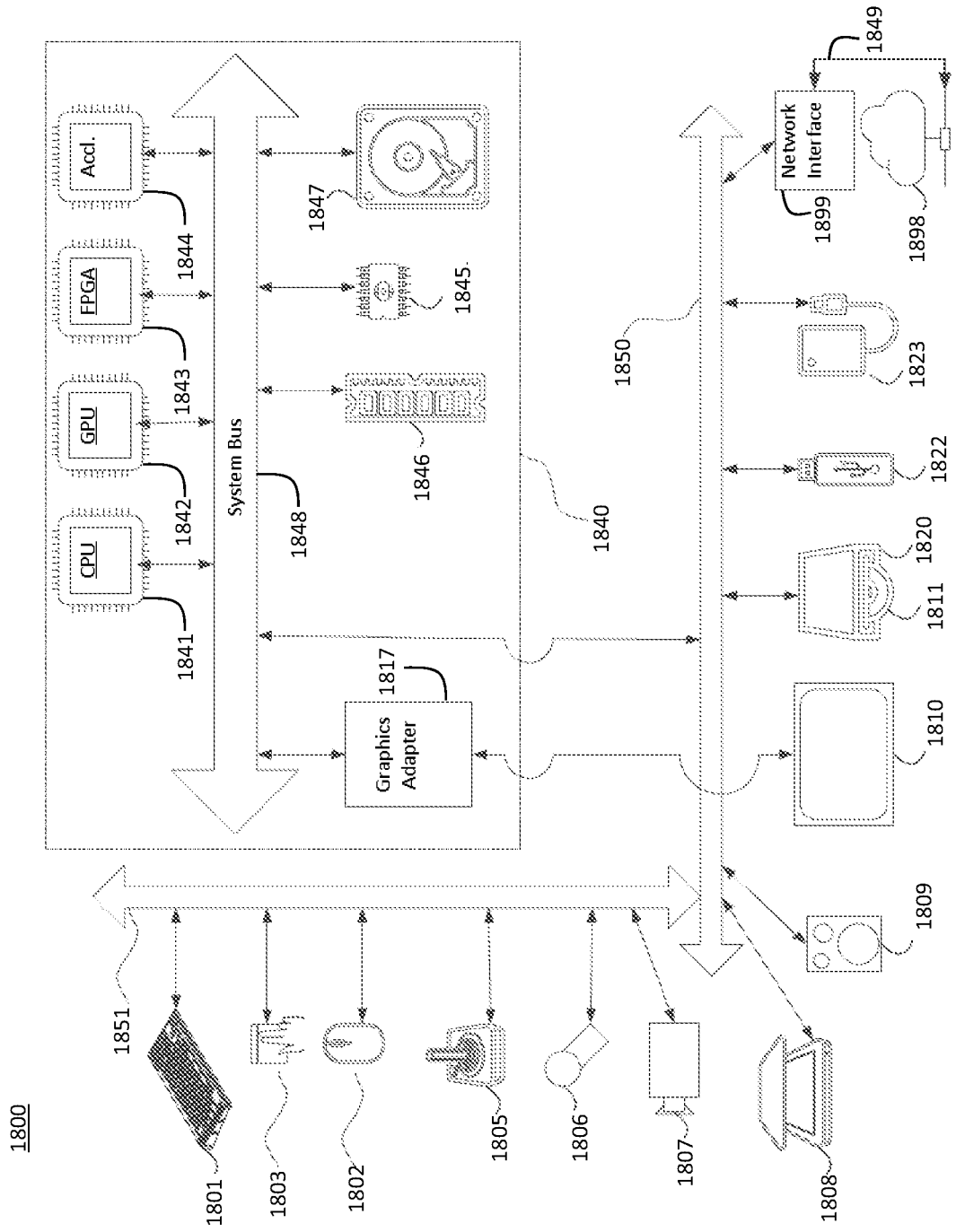
FIG. 18 is a schematic illustration in accordance with embodiments.

The components shown in FIG. 18 for computer system 1800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1800.

Computer system 1800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1801, mouse 1802, trackpad 1803, touch screen 1810, joystick 1805, microphone 1806, scanner 1808, camera 1807.

Computer system 1800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1810, or joystick 1805, but there can also be tactile feedback devices that do not serve as input devices), audio output devices (such as: speakers 1809, headphones (not depicted)), visual output devices (such as screens 1810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1800 can also include human accessible storage devices and their associated media such as optical media including CD/DVD ROM/RW 1820 with CD/DVD 1811 or the like media, thumb-drive 1822, removable hard drive or solid state drive 1823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1800 can also include interface 1899 to one or more communication networks 1898. Networks 1898 can for example be wireless, wireline, optical. Networks 1898 can further be local, wide-area, metropolitan, vehicular and industrial, real-time, delay-tolerant, and so on. Examples of networks 1898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1898 commonly require external network interface adapters that attached to certain general-purpose data ports or peripheral buses (1850 and 1851) (such as, for example USB ports of the computer system 1800; others are commonly integrated into the core of the computer system 1800 by attachment to a system bus as described below (for example Ethernet interface into a PC computer system or cellular network interface into a smartphone computer system). Using any of these networks 1898, computer system 1800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1840 of the computer system 1800.

The core 1840 can include one or more Central Processing Units (CPU) 1841, Graphics Processing Units (GPU) 1842, a graphics adapter 1817, specialized programmable processing units in the form of Field Programmable Gate Areas (FPGA) 1843, hardware accelerators for certain tasks 1844, and so forth. These devices, along with Read-only memory (ROM) 1845, Random-access memory 1846, internal mass storage such as internal non-user accessible hard drives, SSDs, and the like 1847, may be connected through a system bus 1848. In some computer systems, the system bus 1848 can be accessible in the form of one or more physical plugs to enable extensions by additional CPUs, GPU, and the like. The peripheral devices can be attached either directly to the core's system bus 1848, or through a peripheral bus 1851. Architectures for a peripheral bus include PCI, USB, and the like.

CPUs 1841, GPUs 1842, FPGAs 1843, and accelerators 1844 can execute certain instructions that, in combination, can make up the aforementioned computer code. That computer code can be stored in ROM 1845 or RAM 1846. Transitional data can be also be stored in RAM 1846, whereas permanent data can be stored for example, in the internal mass storage 1847. Fast storage and retrieval to any of the memory devices can be enabled through the use of cache memory, that can be closely associated with one or more CPU 1841, GPU 1842, mass storage 1847, ROM 1845, RAM 1846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, an architecture corresponding to computer system 1800, and specifically the core 1840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1840 that are of non-transitory nature, such as core-internal mass storage 1847 or ROM 1845. The software implementing various embodiments of the present disclosure can be stored in such devices and executed by core 1840. A computer-readable medium can include one or more memory devices or chips, according to particular needs. The software can cause the core 1840 and specifically the processors therein (including CPU, GPU, FPGA, and the like) to execute particular processes or particular parts of particular processes described herein, including defining data structures stored in RAM 1846 and modifying such data structures according to the processes defined by the software. In addition or as an alternative, the computer system can provide functionality as a result of logic hardwired or otherwise embodied in a circuit (for example: accelerator 1844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for media streaming, the method comprising:
generating a media service enabler (MSE) configuration of an MSE specification of a 5G media streaming (5GMS) service;
determining whether at least one of a software development kit (SDK) and a microservice conforms to the MSE specification;
setting, by at least one of a function and a service, a configuration of the at least one of the SDK and the microservice according the MSE specification based on determining that the at least one of the SDK and the microservice conforms to the MSE specification; and
controlling an implementation of a 5G media streaming (5GMS) service according to the configuration of the at least one of the SDK and the microservice,
wherein the at least one of the function and the service is external to the implementation of the 5GMS service.

2. The method according to claim 1,
wherein the implementation of the 5GMS service comprises an implementation of at least one of an MSE SDK abstraction, an MSE SDK instantiation, and an MSE microservice.

3. The method according to claim 2,
wherein the MSE SDK abstraction indicates media aspects, an MSE configuration comprising an MSE description document (MDD), and an MSE configuration application programming interface (API) (MCA),
wherein the MSE SDK instantiation indicates the media aspects, the MSE configuration comprising the MDD, and a specific implementation of the MCA, and
the MSE microservice indicates the media aspects, the MSE configuration comprising the MDD, and a service API for the specific implementation of the MCA.

4. The method according to claim 3,
wherein the media aspects indicate any of service access information, consumption reporting, metrics reporting, dynamic policies, and network assistance.

5. The method according to claim 4,
wherein the MDD indicates performance metrics and whether an MSE conforms to the media aspects.

6. The method according to claim 1,
wherein the at least one of the function and the service sets the configuration of the at least one of the SDK and the microservice through a same interface through which the at least one of the function and the service received information in determining that the at least one of the SDK and the microservice conforms to the MSE specification.

7. The method according to claim 6,
wherein determining that the at least one of the SDK and the microservice conforms to the MSE specification comprising determining that at least a format of an MSE description document (MDD) conforms to a format of the at least one of the SDK and the microservice.

8. The method according to claim 6,
wherein generating the MSE configuration of the MSE specification of the 5G media streaming (5GMS) service comprises setting an identifier of an MSE.

9. The method according to claim 8,
wherein the information, received by the at least one of the function and the service, comprises the identifier of the MSE.

10. The method according to claim 1,
wherein controlling the implementation of the 5GMS service according to the configuration of the at least one of the SDK and the microservice comprises indicating to the at least one of the function and the service that external to the implementation of the 5GMS service that the at least one of the function and the service can optionally request a status of the 5GMS service.

11. An apparatus for media streaming, the apparatus comprising:
at least one memory configured to store computer program code;
at least one processor configured to access the computer program code and operate as instructed by the computer program code, the computer program code including:
generating code configured to cause the at least one processor to implement generating a media service enabler (MSE) configuration of an MSE specification of a 5G media streaming (5GMS) service;
determining code configured to cause the at least one processor to implement determining whether at least one of a software development kit (SDK) and a microservice conforms to the MSE specification;
setting code configured to cause the at least one processor to implement setting, by at least one of a function and a service, a configuration of the at least one of the SDK and the microservice according the MSE specification and based on determining that the at least one of the SDK and the microservice conforms to the MSE specification; and
controlling code configured to cause the at least one processor to implement controlling an implementation of a 5G media streaming (5GMS) service according to the configuration of the at least one of the SDK and the microservice,
wherein the at least one of the function and the service is external to the implementation of the 5GMS service.

12. The apparatus according to claim 11,
wherein the implementation of the 5GMS service comprises an implementation of at least one of an MSE SDK abstraction, an MSE SDK instantiation, and an MSE microservice.

13. The apparatus according to claim 12,
wherein the MSE SDK abstraction indicates media aspects, an MSE configuration comprising an MSE description document (MDD), and an MSE configuration application programming interface (API) (MCA),
wherein the MSE SDK instantiation indicates the media aspects, the MSE configuration comprising the MDD, and a specific implementation of the MCA, and
the MSE microservice indicates the media aspects, the MSE configuration comprising the MDD, and a service API for the specific implementation of the MCA.

14. The apparatus according to claim 13,
wherein the media aspects indicate any of service access information, consumption reporting, metrics reporting, dynamic policies, and network assistance.

15. The apparatus according to claim 14,
wherein the MDD indicates performance metrics and whether an MSE conforms to the media aspects.

16. The apparatus according to claim 11,
wherein the at least one of the function and the service sets the configuration of the at least one of the SDK and microservice through a same interface through which the at least one of the function and the service received information in determining that the at least one of the SDK and the microservice conforms to the MSE specification.

17. The method according to claim 16,
wherein determining that the at least one of the SDK and the microservice conforms to the MSE specification comprising determining that at least a format of an MSE description document (MDD) conforms to a format of the at least one of the SDK and the microservice.

18. The method according to claim 16,
wherein generating the MSE configuration of the MSE specification of the 5G media streaming (5GMS) service comprises setting an identifier of an MSE.

19. The apparatus according to claim 18,
wherein the information, received by the at least one of the function and the service, comprises the identifier of the MSE.

20. A non-transitory computer readable medium storing a program causing a computer to execute a process, the process comprising:
generating a media service enabler (MSE) configuration of an MSE specification of a 5G media streaming (5GMS) service;
determining whether at least one of a software development kit (SDK) and a microservice conforms to the MSE specification;
setting, by at least one of a function and a service, a configuration of the at least one of the SDK and microservice according the MSE specification and based on determining that the at least one of the SDK and the microservice conforms to the MSE specification; and
controlling an implementation of a 5G media streaming (5GMS) service according to the configuration of the at least one of the SDK and microservice,
wherein the at least one of the function and the service is external to the implementation of the 5GMS service.

* * * * *